(12) United States Patent
Brown et al.

(10) Patent No.: US 10,498,844 B2
(45) Date of Patent: Dec. 3, 2019

(54) UNIVERSAL DEEP LINKING

(71) Applicant: TUNE, Inc., Seattle, WA (US)

(72) Inventors: Lee Edward Brown, Seattle, WA (US); Lucas Roy Brown, Seattle, WA (US); Sina Yeganeh, Mercer Island, WA (US); Ian Fletcher Sefferman, Bloomfield Hills, MI (US); Daniel Ernst Koch, Seattle, WA (US)

(73) Assignee: TUNE, Inc., Seattle, WA (US)

( * ) Notice: Subject to any disclaimer, the term of this patent is extended or adjusted under 35 U.S.C. 154(b) by 249 days.

(21) Appl. No.: 15/633,642

(22) Filed: Jun. 26, 2017

(65) Prior Publication Data

US 2018/0375946 A1   Dec. 27, 2018

(51) Int. Cl.
  *G06F 15/173*  (2006.01)
  *H04L 29/08*  (2006.01)
  *H04L 12/26*  (2006.01)

(52) U.S. Cl.
  CPC ........... *H04L 67/22* (2013.01); *H04L 43/08* (2013.01); *H04L 67/36* (2013.01)

(58) Field of Classification Search
  CPC .......... H04L 67/22; H04L 43/08; H04L 67/36
  USPC ...................................................... 709/224
  See application file for complete search history.

(56) References Cited

U.S. PATENT DOCUMENTS

| | | | |
|---|---|---|---|
| 2003/0110253 A1* | 6/2003 | Anuszczyk | G06F 8/70 709/224 |
| 2013/0151981 A1* | 6/2013 | Green | G06F 3/0481 715/744 |
| 2014/0026068 A1* | 1/2014 | Park | G06F 3/0482 715/748 |
| 2014/0068520 A1* | 3/2014 | Missig | G06F 3/0482 715/841 |
| 2017/0105053 A1* | 4/2017 | Todd | H04N 21/816 |
| 2017/0149795 A1* | 5/2017 | Day, II | H04L 63/101 |

* cited by examiner

*Primary Examiner* — Atta Khan
(74) *Attorney, Agent, or Firm* — John W. Branch; Lowe Graham Jones PLLC

(57) ABSTRACT

Embodiments are directed to managing user interactions with applications. Entry point information may be provided to an application installed on a client computer. Application information may be obtained from a measurement engine based on the provided entry point information. One or more portions of the application information may be selected based on one or more characteristics of the client computer. An application view of the application may be provided for display on the client computer based on the one or more selected portions of the application information. One or more application metrics associated with the application and the one or more selected portions of the application information may be collected. The one or more collected application metrics may be provided to the measurement engine.

22 Claims, 8 Drawing Sheets

UNIVERSAL DEEP LINKING

TECHNICAL FIELD

This invention relates generally to application monitoring services, and more particularly, but not exclusively, to measuring user interactions with applications.

BACKGROUND

The marketplace for applications is becoming increasingly competitive. Consumers have millions of different applications for many different platforms to choose from. In response to the explosion of the number of applications and market congestion, marketing services organizations have stepped forward to provide a variety of services to help application developers understand the marketplace in general as well as provide a better understanding of how their own customers (and potential customers) are responding to their offerings.

Accordingly, various user tracking solutions have been offered by services or organizations to provide information regarding how users interact with their applications. For example, organizations may track the web navigation history of users to determine information about their interests and/or interaction habits. Information gleaned from the tracking a user's web activity may be used to influence the how applications are designed. To help understand how users respond to particular content and particular content distributions that may be associated with applications, organizations may collect interaction information for various distributions and compare the results. However, as some distributions and/or user interactions may span more than one communication domain (e.g., web, mobile, print, or the like) it may be difficult to effectively evaluate user interactions that may occur across multiple domains. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
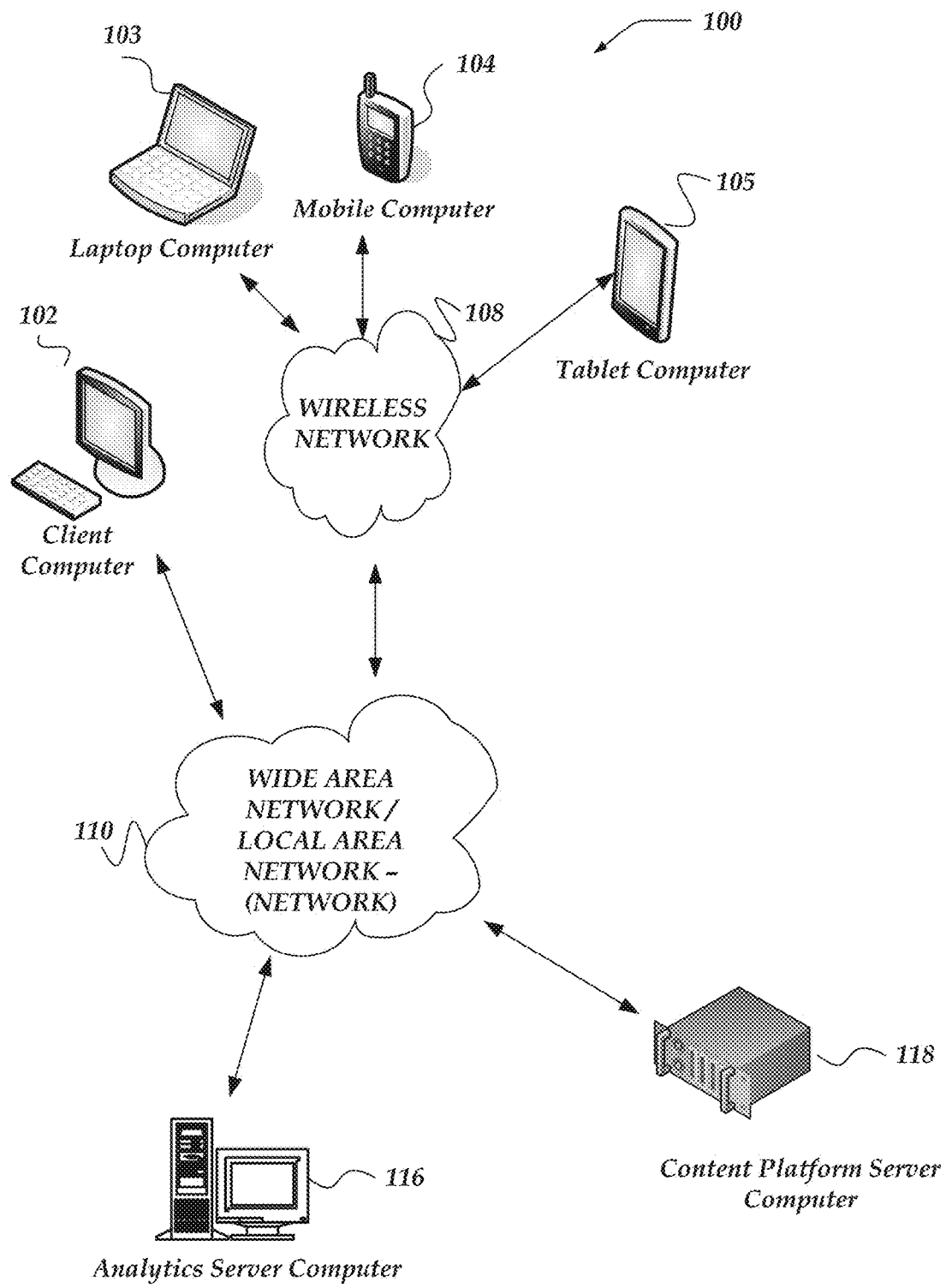
FIG. 1 illustrates a logical schematic of an exemplary system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, JAVA™, PHP, Perl, Python, Go, JavaScript, Ruby, VBScript, ASPX, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "application metrics" refer to measured values of application usages or user interactions with applications. In many cases, application metrics may indicate total accounts, counts, or the like for various actions, such as installations of applications, in-application events (e.g., clicks or the like), in-application purchases, application opens (e.g., instantiations, other activations, or the like of applications), time between in-application purchases, or the like. Often, application metrics may be defined using proprietary application program interfaces (APIs), configuration files, configuration registries, or the like. Also in many cases, application metrics may enable stakeholders (e.g., application developers, content distributers, content platforms, or the like) to report on the effectiveness (e.g., return on resource expenditure) of different content distributions, content methods, or the like.

As used herein, the term "interaction metrics" refer to measured values of user interactions with entry points collect from platforms other than applications. In many cases, interaction metrics may indicate total accounts, counts, or the like for various actions, such as views, impressions, clicks, or the like. Often, interactions metrics may be collected by content providers that provide content that includes the entry point. Also in many cases, interaction metrics may enable stakeholders (e.g., application developers, content distributers, content platforms, or the like) to report on the effectiveness (e.g., return on resource expenditure) of different content distributions, content methods, or the like.

As used herein, the term "measurement engine" refers to an engine arranged to obtain application metrics from various client computers and to provide application information to client computers based on requests that include or otherwise represent entry point information. In many cases, measurement engines may enable the application metrics to be provided to the measurement engines using proprietary APIs. Also in many cases, measurement engines may enable the application information to be requested using proprietary APIs. In some of the various embodiments, the application metrics or the application information are provided using proprietary formats. Also, measurement engine may be arranged to collect interaction metrics from various content providers that may be providing entry points.

As used herein, the term "metrics engine" refers to an engine arranged to collect application metrics on a client computer and to request and obtain application information from a measurement engine based on entry point information. In many cases, metrics engines may be constructed with proprietary APIs.

As used herein, the term "entry point" refers to a reference to a resource or location, such as a uniform resource locator (URL), a link, or the like, associated with content distribution. In many cases, entry points direct client computers to various objects, files, locations, or the like when users select or otherwise interact with the entry points. Entry points are often provided by content providers.

As used herein, the term "content provider" refers to a provider of content that can include one or more entry points. For example, content providers may provide content, such as, websites, banners, short message service (SMS) messages, emails, or the like.

As used herein, the term "application view" refers to a view in an application. Application views may be data structures that represent portions of applications. In some cases, application views may manage user interface features or user interface appearances for portions of applications. Often, application views may accept or respond to user input. In many cases, an application view may include various graphical user-interface elements, buttons, lists, menus, or the like. Also, application views may be associated with particular locations in specific levels of game applications, particular application tasks, or the like. Often, application views may be defined as having particular sets of visual characteristics, such as color schemes or combinations, fonts, font styles, font sizes, particular elements or objects, or the like, for portions of applications, or the like. In some embodiments, application views can be defined by sets of parameters included in configuration files, configuration registries, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing user interactions with applications. In one or more of the various embodiments, when a user of a client computer selects or otherwise interacts with an entry point, the client computer may determine whether the entry point is a universal entry point. For example, the client computer may request entry point information from a network computer specified by the entry point. In some of the various embodiments, if the entry point information is unavailable, the client computer may determine that the entry point is not a universal entry point and may provide generic content specified by the entry point, such as a web page or the like. In some embodiments, if the client computer obtains the entry point information, the client computer may determine that the entry point is a universal entry point.

In one or more of the various embodiments, when the client computer determines that the entry point is a universal entry point, the client computer may determine whether the client computer has installed an application that the entry point information associates with the entry point. In some of the various embodiments, if the application is not installed on the client computer, the client computer may treat the entry point as a non-universal entry point and provide generic content specified by the entry point. In other embodiments, the client computer may activate another application (e.g., a browser, an application store application, or the like) to access a web page, application store, or the like specified by the entry point or the entry point information to enable the user to download the application to the client computer. In some embodiments, if the application is installed on the client computer (or after installing the application on the client computer), the client computer may activate the application.

In one or more of the various embodiments, the client computer may provide one or more portions of the entry point or the entry point information to the application after activating the application. In some of the various embodiments, the application may include a metrics engine that requests application information from a measurement engine based on the one or more provided portions of the entry point or the entry point information. In some embodiments, when the metrics engine may obtain the application information from the measurement engine, the metrics engine selects one or more portions of the application information based on one or more characteristics of the client computer (e.g., operating system, operating system version, platform, platform version, make or model of the client computer, or the like). In some embodiments, the client computer may display one or more application views in the application based on the one or more selected portions of the application information.

In one or more of the various embodiments, the metrics engine may collect various application metrics during or after display of the one or more application views. In some of the various embodiments, the metrics engine may provide the collected application metrics to the measurement engine. In some embodiments, the metrics engine or the measurement engine may correlate the application metrics with the entry point based on one or more portions of the application information, the entry point information, or the like. In some embodiments, the metrics engine may provide one or more reports based on the application metrics and the entry point.

Also briefly stated, various embodiments are directed to managing user interactions with applications. In one or more of the various embodiments, one or more entry points may be provided to an application installed on a client computer. In some of the various embodiments, application information may be obtained from a measurement engine based on the provided entry point information. In some embodiments, one or more portions of the application information may be selected based on one or more characteristics of the client computer. In some embodiments, an application view of the application may be provided for display on the client computer based on the one or more selected portions of the application information. In some embodiments, one or more application metrics associated with the application and the one or more selected portions of the application information may be collected. In some embodiments, the one or more collected application metrics may be provided to the measurement engine.

In one or more of the various embodiments, the one or more collected application metrics may be correlated with an entry point associated with the entry point information based on the application information.

In one or more of the various embodiments, one or more characteristics of the client computer may be compared to the application information. In some of the various embodiments, the one or more portions of the application information may be selected based on the comparison. In some embodiments, one or more view values may be selected from the one or more portions of the application information based on the one or more characteristics of the client computer, such that the one or more view values are associated with the application view.

In one or more of the various embodiments, various portions of the application information may be executed until the application view is successfully displayed on the client computer.

In one or more of the various embodiments, an identification of a platform or operating system of the client computer may be compared to one or more values included in the application information that are associated with various platforms or operating systems. In some of the various embodiments, the one or more portions of the application information may be selected based on the comparison. In some embodiments, one or more view values may be selected from the one or more portions of the application information based on the identification of the platform or operating system of the client computer, such that the one or more view values are associated with the application view.

In one or more of the various embodiments, one or more portions of the entry point information may be provided to the measurement engine.

In one or more of the various embodiments, an entry point may be obtained. In some of the various embodiments, the entry point information may be obtained from the measurement engine based on the provided entry point. In some embodiments, the application installed on the client computer may be activated based on the entry point information. In some embodiments, one or more portions of the entry point information may be provided to the activated application.

In one or more of the various embodiments, an entry point may be obtained. In some of the various embodiments, the entry point information may be obtained from the measurement engine based on the provided entry point. In some embodiments, another application that enables the application to be installed on the client computer associated with the entry point information may be provided. In some embodiments, the other application may be employed to install the application on the client computer based on the entry point information obtained from the measurement engine. In some embodiments, the application installed on the client computer may be activated based on the entry point information. In some embodiments, one or more portions of the entry point information may be provided to the activated application.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)\ wide area networks (WANs) (network) 110, wireless network 108, client computers 102-105, analytics server computer 116, content platform server computer 118, attribution platform server computer 120, or the like.

One or more embodiments of client computers 102-105 are described in more detail below in conjunction with FIG. 2. In one embodiment, some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as laptop computer 103, mobile computer 104, tablet computers 105, or the like. However, portable computers are not so limited and may include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, one or more other applications may also be used to perform various online activities.

Client computers 102-105 also may include one or more other client applications that are configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), one or more identifiers for content (IFAs), or other device identifier. Such information may be provided in a message comprised of one or more network packets, or the like, sent between other client computers, analytics server computer 116, content platform server computer 118, or other computers. In some embodiments, the one or more processors of analytics server computer 116 may be arranged to perform one or more specific tasks for providing analytics associated with marketing services as described in detail below.

Client computers 102-105 may further be configured to include a client application that enables an end-user to log into an end-user account that may be managed by another computer, such as analytics server computer 116, content platform server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connections may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, analytics server computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of analytics server computer 116 is described in more detail below in conjunction with FIG. 3. Briefly, however, analytics server computer 116 includes virtually any network computer capable of executing one or more specialized engine to provide, manage, or report analytics associated with online marketing services.

Although FIG. 1 illustrates analytics server computer 116 and content platform server computer 118 are each illustrated as a single computer, the innovations and/or embodiments are not so limited. For example, one or more functions of analytics server computer 116, content platform server computer 118, or the like, may be distributed across one or more distinct network computers. Moreover, analytics server computer 116, content platform server computer 118, are not limited to a particular configuration such as the one shown in FIG. 1. Thus, in one embodiment, one or more of analytics server computer 116 or content platform server computer 118 may be implemented using a plurality of network computers. In other embodiments, server computers may operate as a plurality of network computers within a cluster architecture, a peer-to-peer architecture, or the like. Further, in one or more of the various embodiments, analytics server computer 116 or content platform server computer 118 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
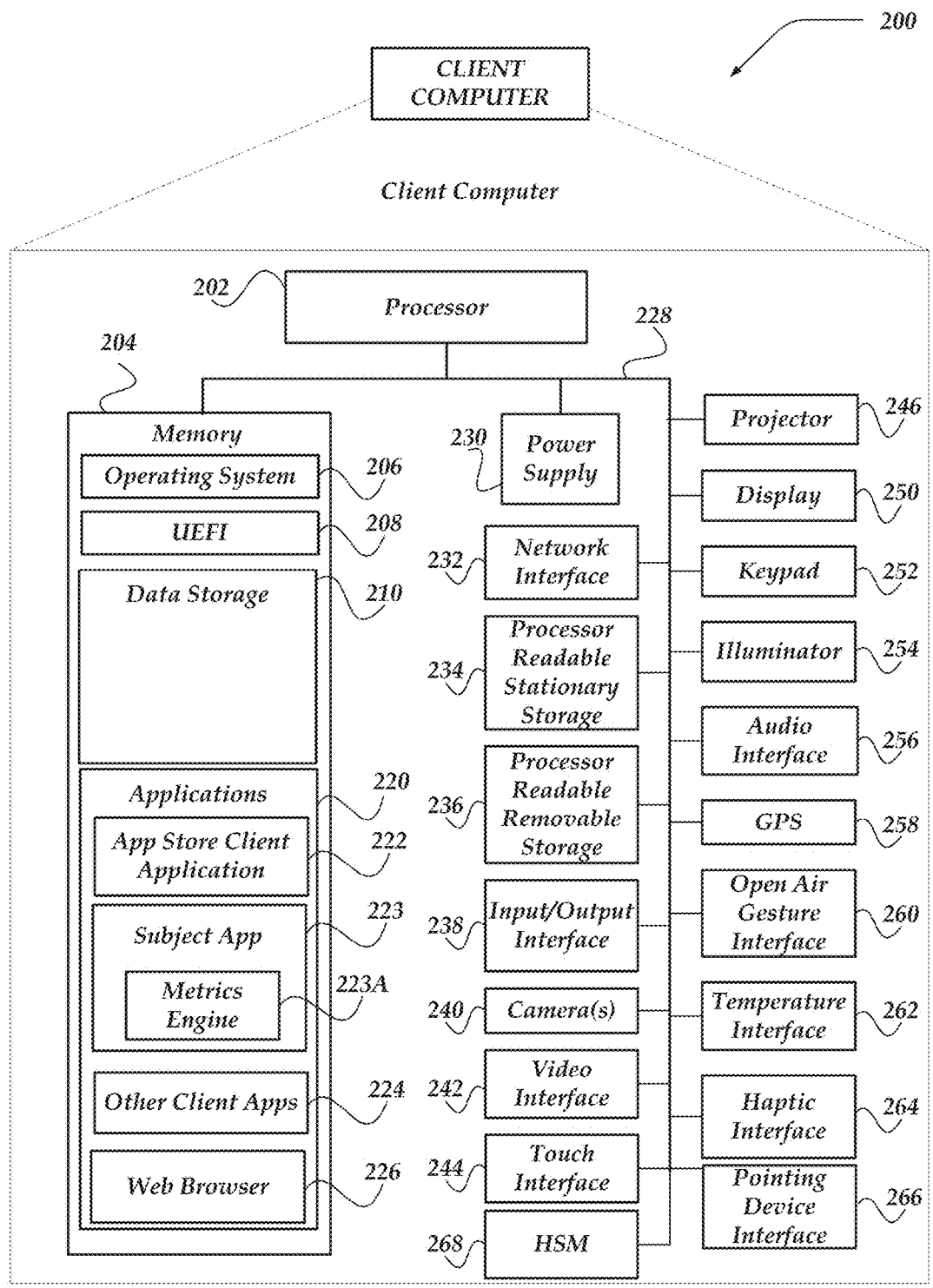
FIG. 2 shows a logical schematic of an exemplary client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. In some cases, a rechargeable or non-rechargeable battery may be used to provide power. The power may also be provided by an external power source, such as an alternative current (AC) adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, Wi-Fi™, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS receiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keypad 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, application store client application 222, subject application 223, other client applications 224, web browser 226, or the like. Client computers may be arranged to exchange communications, such as queries, searches, messages, notification messages, event messages, alerts, performance metrics, log data, application programing interface (API) calls, or the like, combination thereof, with application servers, network file system applications, analytics applications, or the like.

Subject application 223 represents one or more applications that may be installed on client computer 200 by a user, or other provider. In some cases, subject application 223 represents one or more applications provided by an application store server computer, such as application store service computer 120. Subject application 223 represents an application that is arranged to capture user interaction information. Metrics engine 223A represent a module or library installed as part of subject application 223 that facilitates capturing user interaction information and providing it to an analytics server computer, such as analytics server computer 116. In some embodiments, metrics engine 223A may be installed separately from subject application 223. Also, for some subject applications, metric engine 223A may be arranged to execute on client computer 200 separate from subject application 223.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiments, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
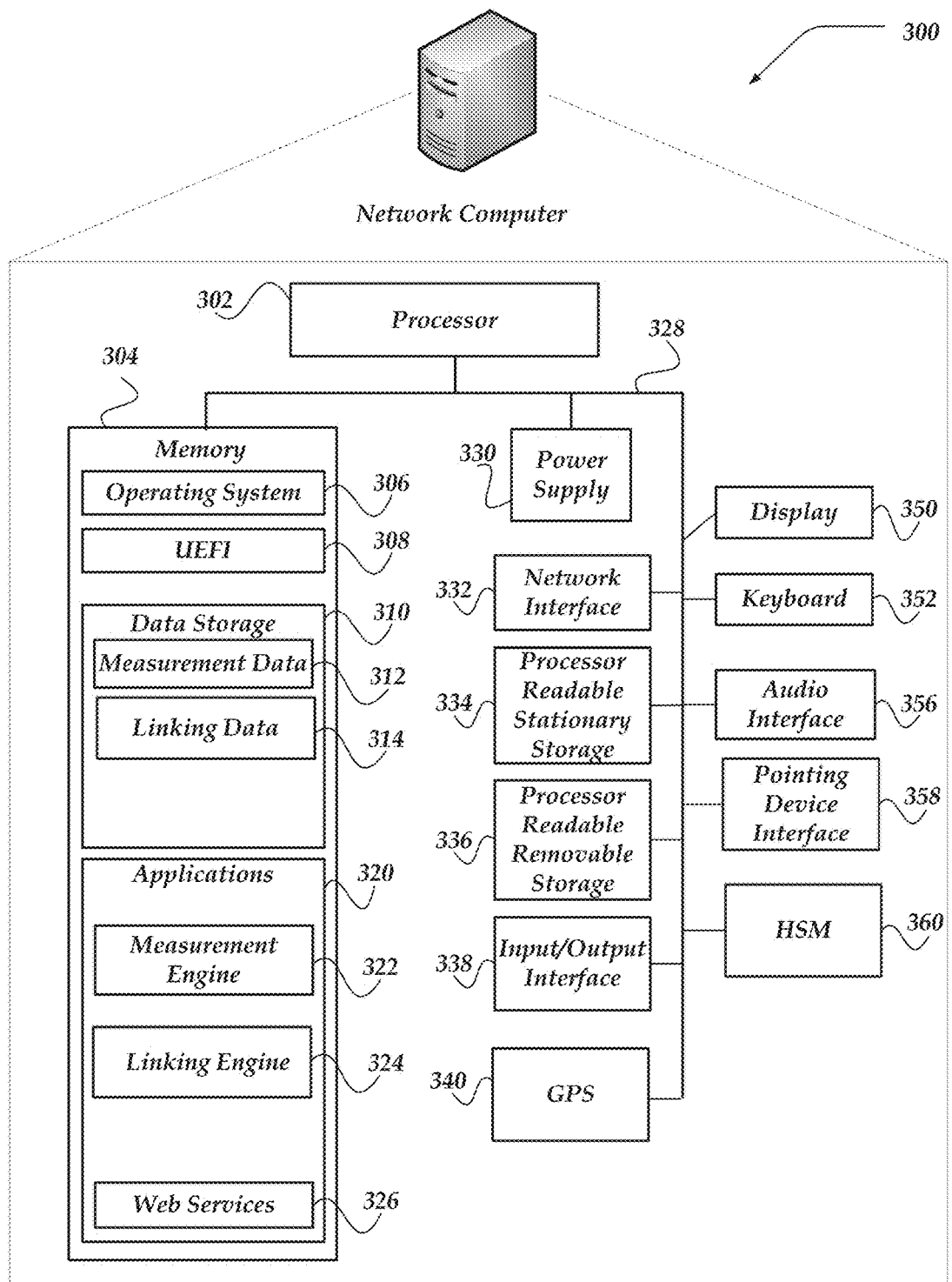
FIG. 3 illustrates a logical schematic of an exemplary network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more of analytics server computer 116, content platform server computer 118, or application store server computer 120 of FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, Wi-Fi™, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a Unified Extensible Firmware Interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, measurement data 312, linking data 314, or the like. Measurement data 312 may be one or more data stores that include one or more records, logs, events, file system entries, databases, or the like, associated with analytics. Linking data 314 may include one or more models for associating entry point information with application information, correlating application metrics with entry points, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, web services 326, and so forth. Applications 320 may include measurement engine 322, linking engine 324, or the like, that may be arranged to perform actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, measurement engine 322, linking engine 324, or the like, may be operative in a cloud-based computing environment. In one or more of the various embodiments, these applications, and others, may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to measurement engine 322, linking engine 324, or the like, may be provisioned and de-commissioned automatically.

Also, in one or more of the various embodiments, measurement engine 322, linking engine 324, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), the network computer may include one or more embedded logic hardware devices instead of one or more CPUs, such as an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a Central Processing Unit (CPU). In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative Logical System Architecture

Figure 4:
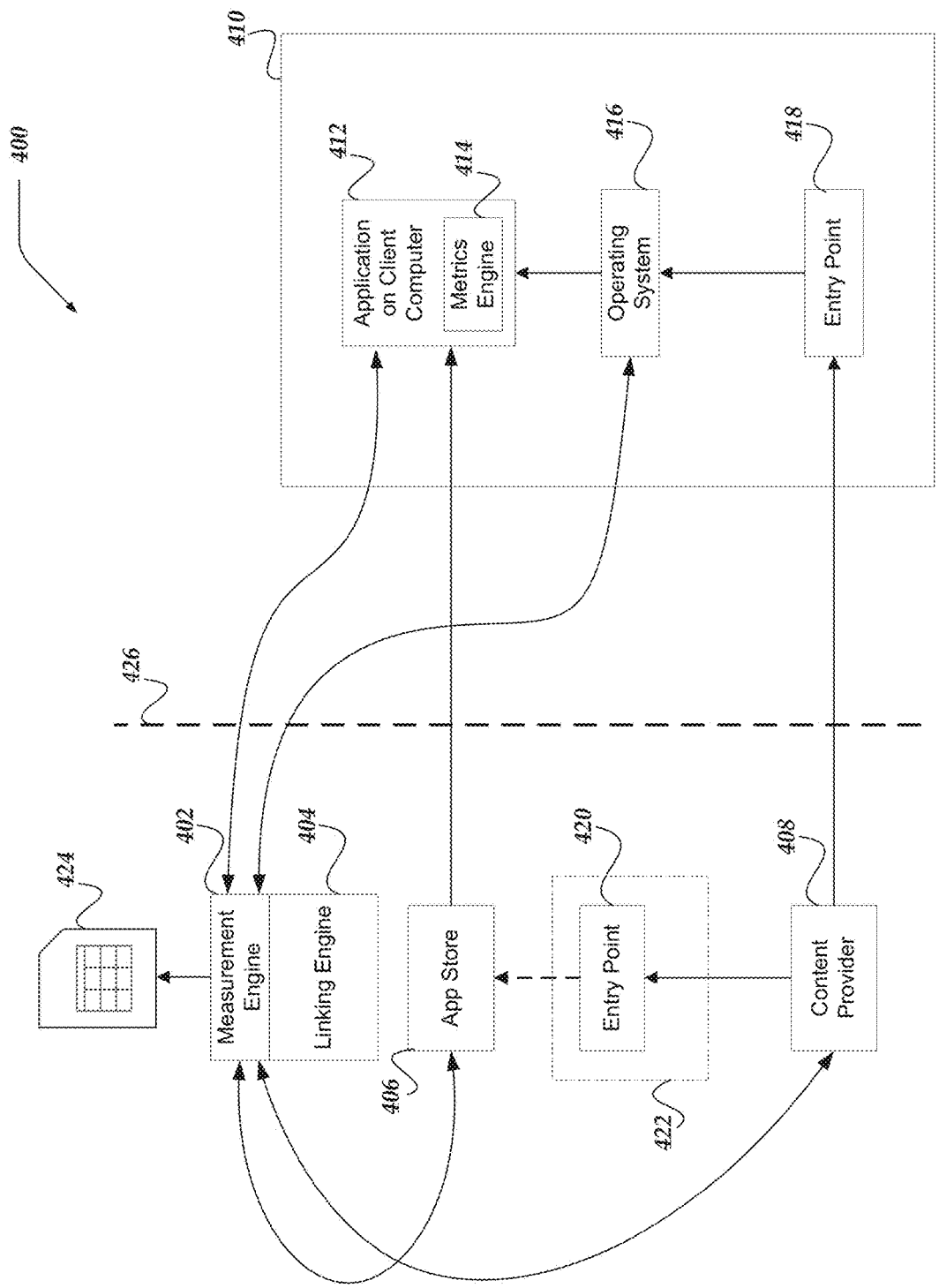
FIG. 4 shows a logical schematic of an exemplary analytics system.

FIG. 4 shows a logical schematic of exemplary analytics system 400. In one or more of the various embodiments, analytics system 400 may be arranged to include measurement engine 402, linking engine 404, or the like. Also, in some of the various embodiments, analytics system 400 may include application store 406, content provider 408, or the like. In some embodiments, analytics system 400 may include client computer 410.

In one or more of the various embodiments, one or more applications 412 may be installed on client computer 410. In some of the various embodiments, application 412 may include metrics engine 414. In at least one of the various embodiments, metrics engine 414 may be integrated into application 412 using libraries, modules, plug-ins, or the like, that are compiled in application 412. Further, in some embodiments, metrics engine 414 may be installed on client computer 410 separate from application 412. For example, in some embodiments, metrics engine 414 may be installed as a separate application and/or included/integrated with operating system 416 of client computer 410. Also, in this illustration, boundary 426 represents that installed application 414 on client computer 412 is separated from app store 406 by virtue of being installed on client computer 412.

In one or more of the various embodiments, content provider 408 may provide entry point 418 to client computer 410. In some of the various embodiments, entry point 418 may be one or more URLs, links, or the like, associated with a content distribution. In some embodiments, entry point 418 may be a URL provided by email or SMS text, an image or other media for display in a web page, or the like. Accordingly, some embodiments, if a user clicks or otherwise selects entry point 418 when application 412 is not installed on client computer 410, client computer 410 may be provided a landing page in app store 412 that is associated with application 412. In some embodiments, if the user clicks or otherwise selects entry point 418 when application 412 is installed on client computer 410, application 412 may be launched or activated and may provide one or more views associated with entry point 418.

In one or more of the various embodiments, content provider 408 may also be arranged to provide entry point 422 that may be hosted in an environment such as web page 420. In some embodiments, web page 422 may be provided by a web server or application server (not shown). In some embodiments, users may interact with web page 422 using various client computers, such as, desktops, laptops, tablet computers, mobile computers, smart phones, or the like. Also, in this example, in one or more of the various embodiments, users may be enabled to interact with web page 422 via client computer 410.

In some of the various embodiments, metrics engine 414 may report various application information, entry point information, client computer information, or the like to measurement engine 402 based on user interaction with application 412, entry point 418, or the like. In one or more of the various embodiments, entry point 418 may be associated with tag information for identifying the offered applications, the content distribution (e.g., distribution identifier), the source of entry point 418, client computer information, user information, or the like. For example, in some embodiments, if entry point 418 is a URL, one or more values may be appended to and/or included in the URL that may be used to identify/track the user and/or other information associated with the distribution. In one or more of the various embodiments, entry point 420 and entry point 422, while they may be physically deployed or displayed in different environments may represent the same logical entry point. For example, if entry point 418 is a URL having a particular path and parameters, entry point 420 may be a URL having the path and parameters as entry point 418.

In one or more of the various embodiments, linking engine 404 may be arranged to perform various actions, such as associating entry point information with application information, correlating application metrics with entry point 418, correlating interaction metrics with entry point 420, or the like. In one or more of the various embodiments, measurement engine 402 may be arranged to record and monitor user interactions with distributed content associated with entry point 418 or entry point 420. In some of the various embodiments, measurement engine 402 may be arranged to provide user report 424 on how many times users viewed entry point 418, entry point 420 or their associated content, how many times users interacted with entry point 418 or entry point 420 (e.g., clicked on the content), quantities or types of user interaction with various portions of application 412 after selecting entry point 418, or the like. Accordingly, measurement engine 402 may be arranged to provide one or more reports, such as report 424, that enable content distributers, content providers, application developers, or the like, to analyze performance of one or more content distributions. In one or more of the various embodiments, the content or format of a particular report may be defined based on configuration information, such as templates, stylesheets, or the like.

In some embodiments, client computer vendors (or operation system developers) may provide special identifiers that are allowed for use by vendors/content providers for tracking application usages/interactions on client computer 410 rather than unique identifiers that may be hardwired to client computer 410, such as MAC addresses, MIEN, or the like. For example, in some embodiments, client computer operating system iOS enables applications to use a provided Identifier for Advertisers (IFA) and/or an Identifier for Vendors (IFV) to identify client computers. Examples of device identifiers include, but are not limited to, a media access control ("MAC") Address, an International Mobile Station Equipment Identity ("IMEI"), a Mobile Equipment Identifier ("MEID"), an Identifier for Advertising ("IFA"), an Identifier for Vendor ("IFV"), an Android ID, an Open Device Identification Number ("ODIN"), an Open Unique Device Identifier ("Open UDID"), a Google AdID, combinations thereof, and the like. By way of a non-limiting example, the IMEI may be an Android IMEI. By way of another non-limiting example, the MEID may be an Android MEID. Another example of a device identifier is a value assigned to client computer 410 by system 400. In some embodiments, other information associated with client computer 410 may also be used as device identifying information, and may include an Internet Protocol (IP) Address, browser information (e.g., browser type, browser version, a cookie, etc.), or the like, or combinations thereof.

In one or more of the various embodiments, entry point 418 may be a universal link viewable or accessible in a client computer (e.g., client computer 410) application, such as web browser 226. In this example, if entry point 418 is selected and application 412 is not installed on client computer 410, operating system 416 of client computer 410 may direct client computer 410 to a web page (or a page in application store 406) based on entry point 418. Alternatively, in this example, if entry point 418 is selected and application 412 is installed on client computer 410, operating system 416 of client computer 410 may direct client computer 410 to activate or instantiate application 412. In some of the various embodiments, entry point 418 may be associated with an association data object that includes information used for validating that entry points are universal links. In some embodiments, the information may establish or indicate that entry point 418 is associated with application 412. In some embodiment, the information associated with entry point 418 may include identifiers or references for one or more views in the associated application. For example, in one or more of the various embodiments, if a user clicks on entry point 418 and application 412 is installed, operating system 416 may activate application 412 and show a particular view in application 412 that is associated with entry point 418.

In one or more of the various embodiments, entry point 418 or entry point 420 may be a short link or vanity link associated with the universal link. In some of the various embodiments, the association data object may associate entry point 418 or entry point 420 with the URL and application 412. Accordingly, in some embodiments, if entry point 418 is selected and application 412 is not installed on client computer 410, operating system 416 may direct client computer 410 to a web page (or a page in application store 406) based on the URL associated with entry point 418. In some embodiments, if entry point 418 is selected and application 412 is installed on client computer 410, operating system 416 of client computer 410 may direct client computer 410 to activate or instantiate application 412.

Similarly, in one or more of the various embodiments, if entry point 420 is selected by a user and application 412 is not installed on client computer 410, the user may be directed to another web page. Optionally, in some embodiments, users the select entry point 420 may be directed to an view in app store 406 that is associated with the application (e.g., application 412) that may be associated with entry point 420.

In one or more of the various embodiments, when the user selects entry point 418, operating system 416 may retrieve one or more portions of the association data object. In some of the various embodiments, operating system 416 may determine whether client computer 410 has installed an application that the association data object associates with entry point 418, such as application 412. In some embodiments, if application 412 is not installed on client computer 410, operating system 416 may cause client computer 410 to display a web page that the association data object associates with entry point 418. In other embodiments, operating system 416 may cause client computer 410 to display the page in application store 406 that the association data object associates with entry point 418 to enable the user to initiate downloading application 412. In some embodiments, when application 412 is installed on client computer 410, operating system 416 may cause client computer 410 to display a view in application 412 based on the one or more portions of the association data object (e.g., after installing, launching, or activating application 412).

In one or more of the various embodiments, entry point 418 or entry point 420 may be a deep link (e.g., linking to a network subdomain, a view within application 412, or the like). In some of the various embodiments, one or more portions of entry point 418 or entry point 420, the association data object, or the like may include or otherwise represent one or more application parameters that may indicate one or more portions or characteristics of one or more application views. For example, parameters may include one or more directory paths, file names, colors, fonts, font sizes, font styles, skins, or the like. In some embodiments, after launching or activating application 412, operating system 416 may provide application 412 with the one or more portions of entry point 418, the association data object, one or more of the application parameters, or the like. Similarly, in one or more of the various embodiments, if entry point 420 is a deep link it may be arranged to correspond to a particular page of a website.

In one or more of the various embodiments, metrics engine 414 may request application information from measurement engine 402. In some of the various embodiments, the request may include or otherwise represent one or more portions of entry point 418, the association data object, identifiers (e.g., application identifier, device identifier, user identifier, or the like), or the like. In some embodiments, measurement engine 402 may record metrics based on the request, such as interaction with application 412 based on the user selection of entry point 418 or the like.

Accordingly, in one or more of the various embodiments, measurement engine 402 may provide application information to application 412 based on the request from metrics engine 414. In some of the various embodiments, the particular application information that may be responsive to the request may be determined based on one or more portions of linking data 314, or the like. For example, in some embodiments, linking data 314 may include associations that may indicate that one or more portions of entry point 418, the association data object, or the like are associated with application information for application 412.

In one or more of the various embodiments, if measurement engine 402 provides application information to metrics engine 414, metrics engine 414 may select one or more portions of the provided application information. In some of the various embodiments, the application information may include various parameters. In some embodiments, various parameters may pertain to different applications, application versions, client computer platforms, client computer platform versions, client computer hardware, or the like. In some embodiments, metrics engine 414 may select the one or more portions of the application information based on known data about one or more of client computer 410, application 412, operating system 416, or the like. For example, the application information may include parameters that are applicable to one operating system and incompatible with another. Accordingly, in some embodiments, one or more portions of the application information may be associated with a particular operating system. In some embodiments, these associations may be defined based on configuration files, user input, configuration registries, or the like. In other embodiments, metrics engine 414 may attempt to employ portions of the application information until a view in application 412 is successfully displayed based on portions of the application information.

In one or more of the various embodiments, metrics engine 414 may collect application metrics that occur after providing the view in application 412. In some of the various embodiments, metrics engine 414 may provide the collected application metrics to measurement engine 402. In some embodiments, one or more of measurement engine 402 or metrics engine 414 may correlate the application metrics with one or more of the request, the association data object, content provider 408, client computer 410, application 412, operating system 416, entry point 418, or the like. In some embodiments, metrics engine 414 may indicate to measurement engine 402 that the provided application metrics are associated with one or more portions of the request, the association data object, content provider 408, client computer 410, application 412, operating system 416, entry point 418, or the like.

In some embodiments, measurement engine 402 may generate report 424 to include one or more representations of application metrics that are correlated with the user selection of entry point 418. In one or more of the various embodiments, report 424 may be presented in a user interface that provides a visualization of the application metrics. Likewise, in one or more of the various embodiments, report 424 may be provided in a format compatible or accessible to one or more third party report services.

In one or more of the various embodiments, user interactions (e.g., interaction metrics) with entry point 420 may be provided or recorded by measurement engine 402. In one or more of the various embodiments, the recorded interaction metrics may be associated with application metrics associated with entry point 418. Also, in some embodiments, interaction metrics based on user interactions observed or detected by content provider 408 (e.g., impressions, clicks, views, or the like) that are associated with entry point 420 may be provided to measurement engine 402 for inclusion in report 424.

Figure 5:
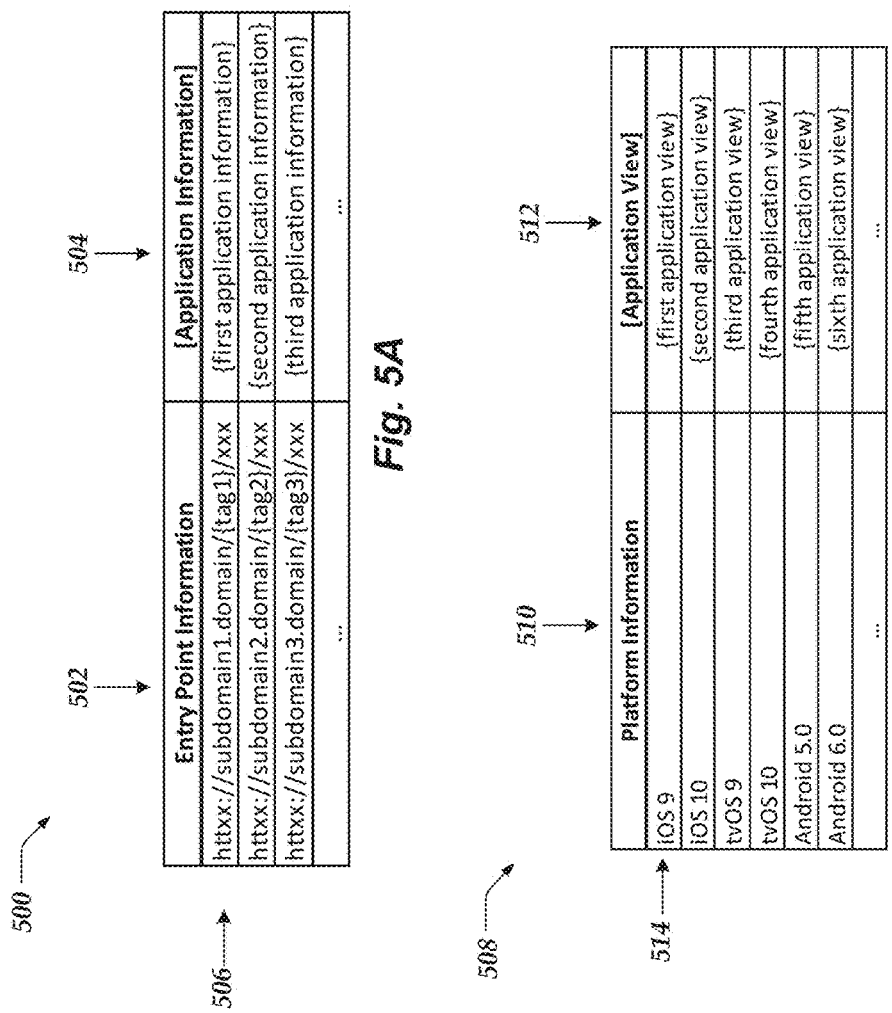
FIG. 5A illustrates a logical schematic of an exemplary data object for associating entry point information and application information.
FIG. 5B shows a logical schematic of an exemplary data object for associating platform information and application views.

FIG. 5A illustrates a logical schematic of exemplary data object 500 for associating entry point information and application information. In one or more of the various embodiments, data object 500 may be one or more portions of linking data 314 or may include one or more portions of linking data 314. In some of the various embodiments, data object 500 may be implemented with various data structures, including objects (e.g., Java objects, C++ objects, JSON, or the like), database tables, arrays, XML files, or the like. In some embodiments, data object 500 may include one or more named fields, such as entry point information field 502, application information field 504, or the like. In some embodiments, entry point information field 502 may hold values corresponding to one or more portions of one or more entry points, references to entry points, or the like. For example, in some embodiments, entry point information may include a URL that may correspond content, content providers, or the like. In some embodiments, application information field 504 may hold values corresponding to various application information, references to application information, or the like. In some embodiments, each record included in data object 500 may indicate application information associated with entry point information, such as record 506.

In one or more of the various embodiments, data object 500 or data object 508 may be generated or populated by one or more linking engines, such as linking engine 404. In some of the various embodiments, the linking engine may crawl one or more portions of an application provided to the linking engine to discover various views in the application, such as application 412. For example, the linking engine may arbitrarily select each selectable user interface control in the application. As another example, the linking engine may search one or more configuration files of the application for views. In some embodiments, the linking engine may generate one or more entry points and one or more portions of application information for various views discovered in the application. In some embodiments, the linking engine may associate the generated URLs with the generated portions of application information. In some embodiments, the linking engine may populate data object 500 or data object 508 with one or more portions of the associations, the generated URLs, the generated application information, or the like or representations thereof.

Also, in one or more of the various embodiments, information for data object 500 or data object 508 may be provided by an application developer associated with application 412. For example, a list or data structure that includes various application views, parameters, or the like, may be provided to linking engine 404 for data object 500 or data object 508. In one or more of the various embodiments, measurement engine 402 may select application information to provide to application based on data object 500. In some of the various embodiments, measurement engine 402 may search for one or more values in entry point information field 502 based on a request from metrics engine 414 for application information. In some embodiments, the request may include one or more portions of entry point 418, references to entry point 418, or the like. In some embodiments, measurement engine 402 may select application information in application information field 504 that is associated with the same record as one or more values in entry point information field 502 that correspond to the request. In some embodiments, measurement engine 402 may provide the selected application information to application 412.

In one or more of the various embodiments, the application information may be provided as a data object, such as data object 508 (FIG. 5B). In some of the various embodiments, data object 508 may be implemented with various data structures, including objects (e.g., Java objects, C++ objects, JSON, or the like), database tables, arrays, XML files, or the like. In some embodiments, data object 508 may include one or more named fields, such as platform information field 510, application view field 512, or the like. In some embodiments, platform information field 510 may hold values corresponding to one or more platforms, platform versions, operating systems, operating system versions, user agents, client computer make or model, or the like. In some embodiments, application view field 512 may hold values corresponding to various application views, references to application views, characteristics of application views, references to characteristics of application views, or the like. In some embodiments, each record included in data object 508 may indicate application view information associated with platform information, such as record 514.

In one or more of the various embodiments, a metrics engine running on a user's device, such as metrics engine 414 may select application view information to employ to display one or more application views based on data object 508. In some of the various embodiments, metrics engine 414 may search for one or more values in platform information field 510 based on known data about operating system 416. For example, metrics engine 414 may determine the one or more values to search for based on configuration files, user input, configuration registries, or the like. In other embodiments, metrics engine 414 may attempt to employ portions of the application view information included in application view field 512 until a view in application 412 is successfully displayed. For example, metrics engine 414 may serially select records in data object 508 to attempt to employ application view information included in each selected record until a view in application 412 is successfully displayed.

In one or more of the various embodiments, data object 508 may include one or more other information fields (e.g., additionally or alternatively to platform information field 510). In some of the various embodiments, the one or more other information fields may include values that indicate various conditions that should be satisfied to display an application view that corresponds to the various condition values. In some embodiments, metrics engine 414 may compare one or more criteria in each record to one or more states of client computer 410, application 412, metrics engine 414, operating 416, or the like. In some embodiments, the one or more states may include battery charge state (e.g., relative to one or more thresholds, charging, or the like), connectivity state (e.g., connected to one or more wireless networks, accessories, or the like), application state (e.g., whether the user unlocked an achievement in application 412, whether application 412 previously provided the application view associated with a given record, or the like), update state (e.g., whether a particular update has been installed in client computer 410 or the like), authenticity state (e.g., whether client computer 410, application 412, operating system 416, or the like include one or more certificates of authenticity or the like), or the like. In some embodiments, metrics engine 414 may select one or more records that include one or more criteria that may be satisfied by the one or more states based on the comparison. In some embodiments, application 412 may provide an application view based on the application view information included in application view field 512 and the selected record.

Generalized Operations

Figure 6:
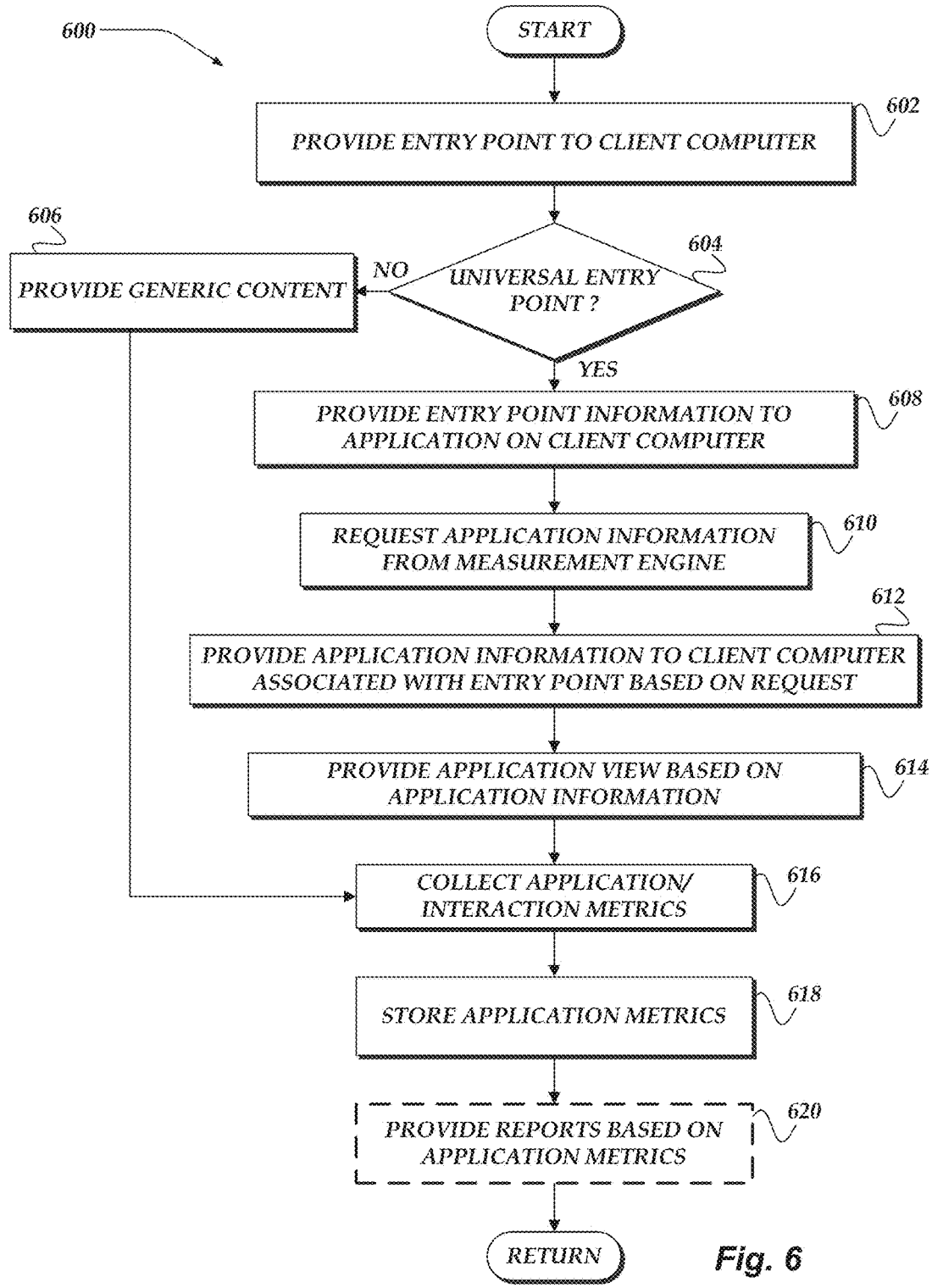
FIG. 6 illustrates an overview flowchart for an exemplary process for universal linking.
Figure 7:
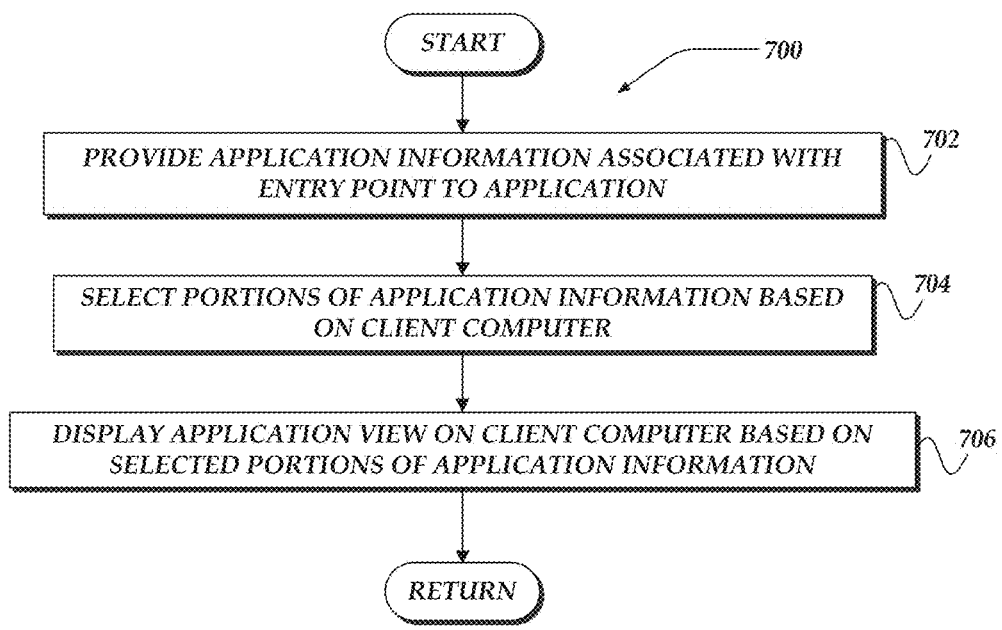
FIG. 7 shows an overview flowchart for an exemplary process for displaying an application view on a client computer.
Figure 8:
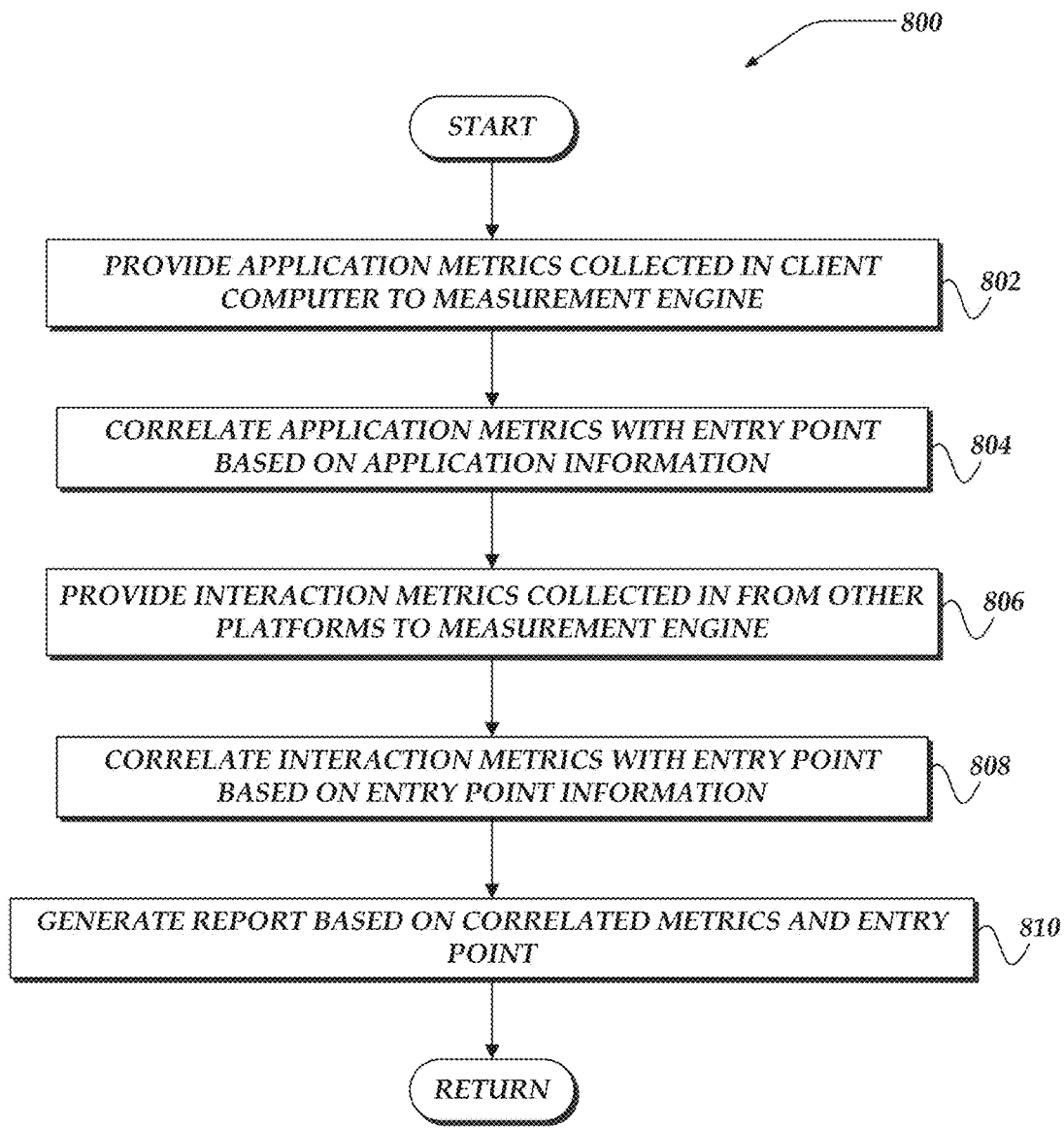
FIG. 8 illustrates an overview flowchart for an exemplary process for generating a report based on metrics correlated with an entry point.

FIGS. 6-8 represent exemplary generalized operations for universal linking, such as client computer 410. In one or more of the various embodiments, processes 600, 700, or 800 described in conjunction with FIGS. 6-8 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in some of the various embodiments, the processes described in conjunction with FIGS. 6-8 may be used for collecting application metrics in accordance with one or more of the various embodiments or architectures such as those described in conjunction with FIGS. 4, 5A, and 5B. Further, in some of the various embodiments, some or all of the actions performed by processes 600, 700, or 800 may be executed in part by measurement engine 322, metrics engine 223A, or the like, running on one or more processors of one or more network computers, one or more processors of one or more client computers, or the like.

FIG. 6 illustrates an overview flowchart for process 600 for universal linking in accordance with one or more of the embodiments. After a start block, at block 602, in one or more of the various embodiments, an entry point, such as entry point 418, may be provided to a client computer, such as client computer 410. In some of the various embodiments, the entry point may be provided to the client computer based on the user clicking or otherwise selecting content, such as one or more portions of an email or SMS text, an image or other media for display in a web page, or the like. In some embodiments, the entry point may be one or more URLs, links, or the like.

At decision block 604, in one or more of the various embodiments, if the provided entry point is not a universal entry point, control may flow to block 620; otherwise, control may flow to block 606.

In some of the various embodiments, the operating system of the client computer may communicate a request to one or more network capable endpoints, network computers, network services, or the like that may be associated the entry point to obtain one or more association data objects that may confirm the association of the entry point with an application, such as application 412. In some embodiments, if the one or more association data objects are not obtained or the one or more association data objects do not indicate that the entry point may be associated with the application, then the operating system may determine that the provided entry point may not be a universal entry point suitable for universal linking. In contrast, in some embodiments, if the one or more association data objects are obtained and confirm that the entry point is associated with the application, the operating system may determine that the provided entry point is a universal entry point suitable for universal linking.

In some embodiments, if the entry point is suitable for universal linking and the application is not installed on the client computer, the operating system may treat the entry point as a non-universal entry point. In other embodiments, if the entry point is a universal entry point and the application is not installed on the client computer, the operating system may direct the client computer to a location in application store 406, or the like to enable the application to be downloaded.

In one or more of the various embodiments, if the entry point is a universal entry point and the application is not installed on the client computer, the entry point information may be used to select other forms of content to provide to client computer. For example, in one or more of the various embodiments, the entry point may be a URL. Accordingly, in one or more of the various embodiments, the rather than providing application information, the linking engine, or the like, may be arranged to provide website or webpage that corresponds to the entry point URL.

In some embodiments, various operating systems may use different built-in facilities to provide the determination of whether the entry point corresponds to a universal entry point suitable for universal linking. Accordingly, in one or more of the various embodiments, one of ordinary skill in the art will appreciate that process 600 may be arranged to rely on these built-in operating system facilities to evaluate the entry point.

In one or more of the various embodiments, the association data may be obtained or validated at the or near the time the application is installed on the client computer. In other embodiments, the association data may be obtained or confirmed after or at the same time a user interacts with an entry point.

At block 606, in one or more of the various embodiments, because the operating system determined that the provided entry point is not a universal entry point suitable for universal linking, the operating system may provide generic content, such as a web pages, pages in an application store, one or more other files, errors messages, or the like associated with the entry point.

In one or more of the various embodiments, the measurement engine may provide particular web page that may be associated with the entry point information. And, as described above, the measurement engine may associate one or more metrics that capture user interactions with the entry point information with the entry point information interactions from other platforms, such as mobile applications, desktop applications, or the like. Next, control may flow to block 616.

At block 608, in one or more of the various embodiments, entry point information may be provided to the application on the client computer. In some of the various embodiments, the entry point information may include one or more portions of the entry point, the association data object, or the like. In one or more of the various embodiments, various operating systems may use different built-in facilities to provide the entry point information to the application. For example, in some embodiments, the operating system may provide the entry point information via a callback method, system message, initialization arguments, launch parameters, or the like.

In one or more of the various embodiments, the entry point information have been previously provided during or as part of the installation process of the application. Accordingly, rather than providing the entry point information to the application upon user interaction with the entry point, the some or all of the entry point information may have been previously provided to the application.

At block 610, in one or more of the various embodiments, a metrics engine of the application (e.g., metrics engine 414) may communicate a request for application information from a measurement engine (e.g., measurement engine 402) based on the entry point information. In some of the various embodiments, the request may include or otherwise represent one or more portions of entry point 418, the association data object, identifiers (e.g., application identifier, device identifier, user identifier, or the like), or the like. In some embodiments, the measurement engine may be arranged to record one or more metrics associated with the request, including correlating user interactions with the application based on the user selection of the entry point or the like.

At block 612, in one or more of the various embodiments, the measurement engine may provide application information to the client computer based on the request, such as data object 508. In some of the various embodiments, the measurement engine may select application information to provide that is associated with one or more portions of entry point 418, the association data object, or the like. In some embodiments, one or more portions of linking data 314 may include or otherwise represent the association, such as data object 502. In some embodiments, the measurement may provide the selected application information to the client computer.

At block 614, in one or more of the various embodiments, the client computer may provide one or more application views based on the provided application information. In some of the various embodiments, the one or more application views may include one or more locations in the application, such as particular pages, property sheets, locations, views, windows, or the like in the application. For example, in one or more of the various embodiments, one entry point may be configured to correspond to a startup view of an application while another entry point may be configured to correspond to an internal view of the application.

Also, in some embodiments, the one or more application views may be modified based on the provided application information. For example, the one or more application views may include one or more modified skins, color schemes, fonts, font sizes, font styles, items, menus, or the like as indicated by one or more portions of the provided application information.

At block 616, in one or more of the various embodiments, one or more of the metrics engine or the measurement engine may collect various application metrics, such as application metrics that occur after providing the view in the application. In some of the various embodiments, the one or more of the metrics engine or the measurement engine may associate the metrics with one or more of the request, the association data object, the client computer, the application, the operating system, the entry point, or the like.

Also, in one or more of the various embodiments, application metrics or interaction metrics from other platforms that may be providing the entry point information to user may be collected. For example, in one or more of the various embodiments, if the entry point information is hosted in a web page and the application is not installed on the mobile device, the user may be directed to a particular web page corresponding with the entry point information rather than a particular view the application. Accordingly, in one or more of the various embodiments, interaction metrics associated with such interactions (e.g., impressions, clicks, user-agent, or the like) may be collected as well.

At block 618, in one or more of the various embodiments, one or more of the metrics engine or the measurement engine may store the collected application metrics or the collected interaction metrics. In some of the various embodiments, the collected metrics may be stored in one or more of the client computer, one or more network computers, local or remote data stores, or the like.

In one or more of the various embodiments, the measurement engine may be arranged to associate the one or more metrics provided by the metrics engine running on the application with metrics collected from other source where the entry point may be in use. For example, in some embodiments, the entry point may be embedded in a web page (e.g., entry point 420 in FIG. 4). Likewise, in one or more of the various embodiments, entry points may be provided to other platforms, including, desktop computer applications, applications targeting different mobile devices/operating systems, or the like.

Accordingly, in one or more of the various embodiments, since the measurement engine may be arranged to provide the same entry point information for different platforms, the metrics provided by different platforms may be indexed or otherwise associated with the same entry point. For example, in some embodiments, application metrics collected by a metric engine running on a mobile device may be grouped or associated with interaction metrics collected by a content platform that hosts or provides web pages that include the entry point.

At optional block 620, in one or more of the various embodiments, the measurement engine may provide one or more reports based on the stored application metrics. Next, control may be returned to a calling process.

FIG. 7 shows an overview flowchart for process 700 for displaying an application view on a client computer in accordance with one or more of the embodiments. For example, process 700 may represent one or more portions of process 600, such as blocks 610, 612, or the like.

After a start block, at block 702, in one or more of the various embodiments, application information associated with an entry point, such as entry point 418, may be provided to an application, such as application 412. In some of the various embodiments, the application may be installed on a client computer, such as client computer 410. In some embodiments, the client computer may request the application information from a measurement engine, such as measurement engine 402. In some embodiments, the request may be based on the user clicking or otherwise selecting content that includes, otherwise represents, or is otherwise associated with the entry point, such as one or more portions of an email or SMS text, an image or other media for display in a web page, or the like. In some embodiments, the entry point may be one or more URLs, links, or the like. In some embodiments, when the measurement engine obtains the request, the measurement engine may select one or more portions of application information that are associated with the entry point based on one or more data objects, such as data object 500. In some embodiments, the measurement engine may provide the one or more associated portions of application information to the application by communicating over a network to the client computer that is hosting the application or metrics engine.

At block 704, in one or more of the various embodiments, a metrics engine of the application, such as metrics engine 414, may select one or more portions of the provided application information based on one or more characteristics of the client computer. In some of the various embodiments, the application information may be provided as a data object, such as data object 508.

In some embodiments, the application information may include view values that correspond to various application views, references to application views, characteristics of application views, references to characteristics of application views, or the like. In some embodiments, the application information may also include client computer values that correspond to one or more platforms, platform versions, operating systems, operating system versions, user agents, client computer make or model, or the like.

In one or more of the various embodiments, the metrics engine may select one or more view values in the provided application information based on one or more characteristics of the client computer, such as platform, platform version, operating system, operating system version, user agents, client computer make or model, or the like. In some of the various embodiments, one or more incompatible view values in the application information may fail to provide a view in the application installed in the client computer based on one or more conflicts between the one or more characteristics of the client computer and one or more client computer values associated with the one or more incompatible view values. For example, one or more of the view values may indicate an application view that can be successfully provided in one operating system (e.g., iOS) yet not another operating system (e.g., Android). In contrast, in some embodiments, the application information may include one or more view values that can be used to successfully provide a particular view in the application installed in the client computer based on one or more matches between the one or more characteristics of the client computer and one or more client computer values associated with the one or more selected view values. In some embodiments, the metrics engine may select one or more view values based on client computer values included or otherwise represented in the application information. In some embodiments, the metrics engine may compare the client computer values in the application information to known data about the client computer, such as data provided by one or more configuration files, user inputs, configuration registries, or the like, and may select one or more view values associated with one or more client computer values in the application information that match one or more known client computer characteristics. In other embodiments, the metrics engine may attempt to employ one or more of the view values until a view in the application is successfully displayed.

At block 706, in one or more of the various embodiments, an application view may be displayed on the client computer based on the one or more selected view values in the application information. In some of the various embodiments, the one or more selected view values may include or otherwise represent one or more locations in the application, such as particular pages, property sheets, locations, views, windows, or the like in the application. In some embodiments, the one or more selected view values may include or otherwise represent one or more parameters that may modify one or more characteristics of the application view. For example, the one or more displayed application views may include one or more specified skins, color schemes, fonts, font sizes, font styles, items, menus, or the like as indicated by the one or more selected view values.

Next, control may be returned to a calling process.

FIG. 8 illustrates an overview flowchart for process 800 for generating a report based on metrics correlated with an entry point in accordance with one or more of the embodiments. For example, process 800 may represent one or more portions of process 600, such as blocks 614, 616, 618, or the like.

After a start block, at block 802, in one or more of the various embodiments, one or more application metrics collected in a client computer, such as client computer 410, may be provided to a measurement engine, such as measurement engine 402. In some of the various embodiments, the application metrics may be collected by a metrics engine included in an application installed in the client computer, such as metrics engine 414 included in application 412. In some embodiments, the metrics engine may collect application metrics that occur after providing a view in the application based on application information provided to the application. In some embodiments, the application metrics may be associated with one or more quantity indicators, quality indicators, identifiers, or the like for clicks, entry point, impressions, views, conversions, installations, application-feature interaction, other activity or engagements, or the like that are associated with the application and the application information. In some embodiments, the application metrics may be associated with the application information based on the application metrics occurring during an application session that includes the application view provided based on the application information. In some embodiments, the application session may terminate based on closing, exiting, or otherwise deactivating the application. In some embodiments, the metrics engine may provide the collected application metrics to the measurement engine on a continuous, periodic, or as-available basis. In some embodiments, the metrics engine may cache the application metrics at the mobile device until the measurement engine is available to the metrics engine.

In one or more of the various embodiments, the metrics engine may be arranged provide the application metrics to the measurement engine by communicating them over a network. In some of the various embodiments, if the network or the measurement engine is inaccessible, the metrics engine may store the application metrics locally. In some embodiments, the metrics engine may periodically check the accessibility of the network or the measurement engine. In some embodiments, the metrics engine may communicate the locally stored application metrics to the measurement engine over the network based on the network or measurement engine becoming accessible. In other embodiments, the metrics engine may periodically attempt to communicate the locally stored application metrics to the measurement engine over the network until the locally stored application metrics are successfully communicated to the measurement engine. In some embodiments, the metrics engine may communicate the locally stored application metrics to the measurement engine over the network based on an indication that the network or the measurement engine has become accessible, such as a signal from another application, another engine, an input by the user, or the like.

Accordingly, in one or more of the various embodiments, the metrics engine may be arranged to adapt how application metrics may be provided to the measurement engine based on the quality or availability of network connectivity with the client computer hosting the metrics engine and the network computer hosting the measurement engine. In one or more of the various embodiments, if the available network quality, based on band-width, throughput, congestion, stability, or the like, drops below a configured threshold, the metrics engine may temporarily cache the application metrics in memory until the network quality is restored back to the required threshold. In some embodiments, if the network quality is restored the metrics engine may be arranged to communicate the cached application metrics to the measurement engine.

At block 804, in one or more of the various embodiments, the collected application metrics may be correlated with an entry point based on the application information. In some of the various embodiments, the entry point may have been provided to the client computer based on the user clicking or otherwise selecting content, such as one or more portions of an email or SMS text, an image or other media for display in a web page, or the like. In some embodiments, the entry point may be one or more URLs, links, or the like. In some embodiments, the application may have requested the application information from the measurement engine based on the entry point. In some embodiments, the metrics engine may identify or otherwise represent the application information when communicating the application metrics to the measurement engine. In some embodiments, the measurement engine may determine that the application information is associated with the entry point based on one or more data objects, such as data object 500. In some embodiments, the measurement engine may correlate the application metrics based on the association between the application information and the entry point. In other embodiments, the metrics engine may correlate the application metrics with the entry point and communicate the correlation to the measurement engine.

At block 806, in one or more of the various embodiments, one or more interaction metrics collected in on different platforms, such as web pages, desktop applications, other mobile applications for different mobile operating systems, or the like, may be provided to a measurement engine, such as measurement engine 402. In some of the various embodiments, the interaction metrics may be collected by a content provider that provided the webpage or website that included the entry point, such as content provider 408. In some embodiments, the interaction metrics may be associated with one or more quantity indicators, quality indicators, identifiers, or the like for clicks, entry point, impressions, views, conversions, installations, application-feature interaction, other activity or engagements, or the like, that may be associated with the entry point. In some embodiments, the interaction metrics may be provided to the measurement engine on a continuous, periodic, or as-available basis. In some embodiments, the content provider may cache the interaction metrics until the measurement engine is available to collect the interaction metrics.

In one or more of the various embodiments, the content provider may be arranged provide the interaction metrics to the measurement engine by communicating them over a network. In some of the various embodiments, if the network or the measurement engine is inaccessible, the content provider may store the interaction metrics locally. In some embodiments, the content provider may periodically check the accessibility of the network or the measurement engine. In some embodiments, the content provider may communicate the locally stored interaction metrics to the measurement engine over the network based on the network or measurement engine becoming accessible. In other embodiments, the content provider may periodically attempt to communicate the locally stored interaction metrics to the measurement engine over the network until the locally stored interaction metrics are successfully communicated to the measurement engine. In some embodiments, the content provider may communicate the locally stored interaction metrics to the measurement engine over the network based on an indication that the network or the measurement engine has become accessible, such as a signal from another application, another engine, an input by the user, or the like.

Accordingly, in one or more of the various embodiments, the metrics engine may be arranged to adapt how interaction metrics may be provided to the measurement engine based on the quality or availability of network connectivity with the content provider and the network computer hosting the measurement engine. In one or more of the various embodiments, if the available network quality, based on band-width, throughput, congestion, stability, or the like, drops below a configured threshold, the content provider may temporarily cache the interaction metrics in memory until the network quality is restored back to the required threshold. In some embodiments, if the network quality is restored the content provider may be arranged to communicate the cached interaction metrics to the measurement engine.

At block 808, in one or more of the various embodiments, the collected interaction metrics may be correlated with an entry point based on the entry point information. In some of the various embodiments, the entry point may have been provided by a content provider to the client computer via various content, such as one or more portions of an email or SMS text, an image or other media for display in a web page, or the like. In some embodiments, the entry point may be one or more URLs, links, or the like. In some embodiments, the measurement engine may correlate the interaction metrics based on the entry point information, such as, a URL, query parameters, session identifiers, cookies, or the like.

At block 810, in one or more of the various embodiments, the measurement engine may generate one or more reports based on the correlated application metrics and the correlated interaction metrics and the entry point. In some of the various embodiments, the report may indicate resources collected per interaction (e.g., click, selection, or the like) with the entry point. In some embodiments, the report may indicate one or more of a quantity or quality of user interaction with the application based on the entry point (e.g., duration or extent of interaction with the application, resources spent by the user while interacting with the application, or the like). In some embodiments, the report may indicate resources required to distribute content based on the entry point. In some embodiments, the report may depict the reported information in various formats, such as graphs, charts, lists, or the like.

Importantly, in one or more of the various embodiments, the measurement engine may be arranged to enable users to view or compare metrics generated on various platforms, such as, mobile devices, different mobile operating systems, web pages, desktop applications, or the like. Accordingly, in one or more of the various embodiments, metrics from different platforms for the same entry point may be included in the same report. Further, in some embodiments, some correlated metrics may be a combination of interaction metrics and application metrics. In some embodiments, configuration information, policy rules, user input, or the like, may be employed to define, compute, or select correlated metrics for including in a report.

Next, control may be returned to a calling process.

It will be understood that each block of the flowchart illustration, and combinations of blocks in the flowchart illustration, can be implemented by computer program instructions. These program instructions may be provided to one or more processors, including one or more special purpose processors to produce a machine, such that the instructions, which execute on the one or more processors, create means for implementing the actions specified in the flowchart block or blocks. The computer program instructions may be executed by the one or more processors to cause a series of operational steps to be performed by the one or more processors to produce a computer-implemented process such that the instructions execute on the one or more processors to provide steps for implementing the actions specified in the flowchart block or blocks. The computer program instructions may also cause at least some of the one or more processors to perform the operational steps shown in the blocks of the flowchart in parallel. Moreover, some of the steps may also be performed across more than one processor, such as might arise in a multi-processor computer system and/or multi-core hardware processor. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of actions for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Further, in one or more embodiments (not shown in the figures), the logic in the illustrative flowcharts may be executed using one or more embedded logic hardware devices instead of a CPU, such as, an Application Specific Integrated Circuit (ASIC), Field Programmable Gate Array (FPGA), Programmable Array Logic (PAL), or the like, or combination thereof. The one or more embedded logic hardware devices may directly execute embedded logic to perform actions described above. In at least one embodiment, one or more microcontrollers may be arranged to directly execute their own embedded logic to perform actions and access their own internal memory and their own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for managing user interactions with applications using a client computer having one or more processors that perform actions, comprising:
    employing an application installed on a client computer to receive entry point information, wherein the receiving performs further actions, comprising:
        obtaining an entry point;
    obtaining the entry point information from a measurement engine based on the provided entry point;
        activating the application installed on the client computer based on the entry point information; and
        providing one or more portions of the entry point information to the activated application; and
    employing the measurement engine to provide application information based on the provided entry point information;
    selecting one or more portions of the application information based on one or more characteristics of the client computer, wherein the selecting performs further actions comprising;
        comparing an identification of a platform or an operating system of the client computer to one or more values included in the application information that are associated with various platforms or operating systems;
        selecting the one or more portions of the application information based on the comparison; and
        selecting one or more view values from the one or more portions of the application information based on the identification of the platform or the operating system of the client computer, wherein the one or more view values are associated with the application view; and
    providing an application view of the application for display on the client computer based on the one or more selected portions of the application information;
    collecting one or more application metrics associated with the application and the one or more selected portions of the application information; and
    providing the one or more collected application metrics to the measurement engine.

2. The method of claim 1, further comprising:
    correlating the one or more collected application metrics with an entry point associated with the entry point information based on the application information; and
    correlating one or more interaction metrics with the entry point based on the entry point information, wherein the one or more interaction metrics are provided by one or more content providers.

3. The method of claim 1, wherein selecting the one or more portions of the application information, further comprises:
    comparing one or more characteristics of the client computer to the application information;
    selecting the one or more portions of the application information based on the comparison; and
    selecting one or more view values from the one or more portions of the application information based on the one or more characteristics of the client computer, wherein the one or more view values are associated with the application view.

4. The method of claim 1, wherein selecting the one or more portions of the application information, further comprises, executing various portions of the application information until the application view is successfully displayed on the client computer.

5. The method of claim 1, wherein requesting the application information from the measurement engine, further comprises, providing one or more portions of the entry point information to the measurement engine.

6. The method of claim 1, wherein receiving the entry point information, further comprises:
providing another application that enables the application to be installed on the client computer associated with the entry point information; and
employing the other application to install the application on the client computer based on the entry point information obtained from the measurement engine.

7. A system for managing user interactions with applications, comprising:
a client computer, comprising:
a client computer transceiver that communicates over the network;
a client computer memory that stores at least instructions; and
one or more processor devices that execute instructions that perform actions, including:
employing an application installed on a client computer to receive entry point information, wherein the receiving performs further actions, comprising:
obtaining an entry point;
obtaining the entry point information from a measurement engine based on the provided entry point;
activating the application installed on the client computer based on the entry point information; and
providing one or more portions of the entry point information to the activated application; and
employing a measurement engine to provide application information based on the provided entry point information;
selecting one or more portions of the application information based on one or more characteristics of the client computer, wherein the selecting performs further actions comprising:
comparing an identification of a platform or an operating system of the client computer to one or more values included in the application information that are associated with various platforms or operating systems;
selecting the one or more portions of the application information based on the comparison; and
selecting one or more view values from the one or more portions of the application information based on the identification of the platform or the operating system of the client computer, wherein the one or more view values are associated with the application view; and
providing an application view of the application for display on the client computer based on the one or more selected portions of the application information;
collecting one or more application metrics associated with the application and the one or more selected portions of the application information; and
providing the one or more collected application metrics to the measurement engine; and
a network computer, comprising:
a transceiver that communicates over the network;
a memory that stores at least instructions; and
one or more processor devices that execute instructions that perform actions, including, employing the measurement engine to perform actions, including:
providing application information to the client computer based on the entry point information; and
obtaining the one or more collected application metrics from the client computer.

8. The system of claim 7, wherein the one or more processor devices execute further instructions that perform further actions, comprising:
correlating the one or more collected application metrics with an entry point associated with the entry point information based on the application information; and
correlating one or more interaction metrics with the entry point based on the entry point information, wherein the one or more interaction metrics are provided by one or more content providers.

9. The system of claim 7, wherein selecting the one or more portions of the application information, further comprises:
comparing one or more characteristics of the client computer to the application information;
selecting the one or more portions of the application information based on the comparison; and
selecting one or more view values from the one or more portions of the application information based on the one or more characteristics of the client computer, wherein the one or more view values are associated with the application view.

10. The system of claim 7, wherein selecting the one or more portions of the application information, further comprises, executing various portions of the application information until the application view is successfully displayed on the client computer.

11. The system of claim 7, wherein requesting the application information from the measurement engine, further comprises, providing one or more portions of the entry point information to the measurement engine.

12. The system of claim 7, wherein providing the entry point information to the application installed on the client computer, further comprises:
providing another application that enables the application to be installed on the client computer associated with the entry point information; and
employing the other application to install the application on the client computer based on the entry point information obtained from the measurement engine.

13. A processor readable non-transitory storage media that includes instructions for managing user interactions with applications, wherein execution of the instructions by one or more hardware processors performs actions, comprising:
employing an application installed on a client computer to receive entry point information, wherein the receiving performs further actions, comprising:
obtaining an entry point;
obtaining the entry point information from a measurement engine based on the provided entry point;
activating the application installed on the client computer based on the entry point information; and
providing one or more portions of the entry point information to the activated application; and
employing a measurement engine to provide application information based on the provided entry point information;
selecting one or more portions of the application information based on one or more characteristics of the client computer, wherein the selecting performs further actions comprising:
comparing an identification of a platform or an operating system of the client computer to one or more values included in the application information that are associated with various platforms or operating systems;

selecting the one or more portions of the application information based on the comparison; and selecting one or more view values from the one or more portions of the application information based on the identification of the platform or the operating system of the client computer, wherein the one or more view values are associated with the application view; and providing an application view of the application for display on the client computer based on the one or more selected portions of the application information;

collecting one or more application metrics associated with the application and the one or more selected portions of the application information; and providing the one or more collected application metrics to the measurement engine.

14. The media of claim 13, wherein the actions further comprise:

correlating the one or more collected application metrics with an entry point associated with the entry point information based on the application information; and correlating one or more interaction metrics with the entry point based on the entry point information, wherein the one or more interaction metrics are provided by one or more content providers.

15. The media of claim 13, wherein selecting the one or more portions of the application information, further comprises:

comparing one or more characteristics of the client computer to the application information;

selecting the one or more portions of the application information based on the comparison; and selecting one or more view values from the one or more portions of the application information based on the one or more characteristics of the client computer, wherein the one or more view values are associated with the application view.

16. The media of claim 13, wherein selecting the one or more portions of the application information, further comprises, executing various portions of the application information until the application view is successfully displayed on the client computer.

17. The media of claim 13, wherein requesting the application information from the measurement engine, further comprises, providing one or more portions of the entry point information to the measurement engine.

18. A client computer for managing user interactions with applications, comprising:

a transceiver that communicates over the network;

a memory that stores at least instructions; and one or more processor devices that execute instructions that perform actions, including:

employing an application installed on a client computer to receive entry point information, wherein the receiving performs further actions, comprising:

obtaining an entry point;

obtaining the entry point information from a measurement engine based on the provided entry point;

activating the application installed on the client computer based on the entry point information; and providing one or more portions of the entry point information to the activated application; and employing a measurement engine to provide application information based on the provided entry point information;

selecting one or more portions of the application information based on one or more characteristics of the client computer, wherein the selecting performs further actions comprising;

comparing an identification of a platform or an operating system of the client computer to one or more values included in the application information that are associated with various platforms or operating systems;

selecting the one or more portions of the application information based on the comparison; and selecting one or more view values from the one or more portions of the application information based on the identification of the platform or the operating system of the client computer, wherein the one or more view values are associated with the application view; and providing an application view of the application for display on the client computer based on the one or more selected portions of the application information;

collecting one or more application metrics associated with the application and the one or more selected portions of the application information; and providing the one or more collected application metrics to the measurement engine.

19. The client computer of claim 18, wherein the actions further comprise:

correlating the one or more collected application metrics with an entry point associated with the entry point information based on the application information; and correlating one or more interaction metrics with the entry point based on the entry point information, wherein the one or more interaction metrics are provided by one or more content providers.

20. The client computer of claim 18, selecting the one or more portions of the application information, further comprises:

comparing one or more characteristics of the client computer to the application information;

selecting the one or more portions of the application information based on the comparison; and selecting one or more view values from the one or more portions of the application information based on the one or more characteristics of the client computer, wherein the one or more view values are associated with the application view.

21. The client computer of claim 18, wherein selecting the one or more portions of the application information, further comprises, executing various portions of the application information until the application view is successfully displayed on the client computer.

22. The client computer of claim 18, wherein requesting the application information from the measurement engine, further comprises, providing one or more portions of the entry point information to the measurement engine.

* * * * *